(12) United States Patent
Kato et al.

(10) Patent No.: US 6,683,799 B2
(45) Date of Patent: Jan. 27, 2004

(54) INVERTER PROTECTING APPARATUS

(75) Inventors: Hideaki Kato, Tochigi-ken (JP); Takashi Ogawa, Gunma-ken (JP); Tetsuo Nomoto, Gunma-ken (JP); Yuichi Izawa, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/115,591

(22) Filed: Apr. 2, 2002

(65) Prior Publication Data

US 2003/0117753 A1 Jun. 26, 2003

(30) Foreign Application Priority Data

Apr. 23, 2001 (JP) ........................................ 2001-123753

(51) Int. Cl.[7] ............................ H02M 5/45; H02H 7/122
(52) U.S. Cl. ..................... 363/37; 363/132; 363/56.02
(58) Field of Search ............................ 363/37, 55, 56.02, 363/58, 60, 64, 132, 127; 318/432, 433, 434, 439, 801, 254; 388/903, 904

(56) References Cited

U.S. PATENT DOCUMENTS 6,194,856 B1 * 2/2001 Kobayashi et al. ......... 318/432

* cited by examiner

*Primary Examiner*—Rajnikant B. Patel
(74) *Attorney, Agent, or Firm*—Darby & Darby

(57) ABSTRACT

An apparatus for protecting an inverter against over current is constructed of a plurality of switching devices connected between the positive and negative terminals of a DC power source. The apparatus has a plurality of detecting devices that convert the currents passing through the plurality of switching devices into voltages and generate detection outputs, a plurality of amplifier circuits, a plurality of comparing devices that supply the detection outputs of the detecting devices to the amplifier circuits and generate an abnormality output if an absolute value of a detection output exceeds a predetermined value, and a protecting device that interrupts the drive of all switching devices if any of the comparing devices issues an abnormality output.

9 Claims, 8 Drawing Sheets

INVERTER PROTECTING APPARATUS

BACKGROUND OF THE INVENTION

1. Field of the Invention

The present invention relates to a protecting apparatus for an inverter constituted by a plurality of switching devices connected between an anode and a cathode of a DC power source.

2. Description of the Related Art

Hitherto, a motor for driving a hermetic electric compressor constituting, for example, an air conditioner or a refrigerating cycle of an electric refrigerator or the like, a synchronous motor that has a permanent magnet in its rotor and is driven by direct current, or an induction motor driven by alternating current has been adopted. In recent years, a synchronous induction motor having a permanent magnet for its rotor and squirrel-cage secondary conductors have also been used. These motors are driven by inverters.

A drive circuit of such a conventional motor will now be described with reference to FIG. 10. Shown in the drawing are an inverter main circuit power source Vcc1, an inverter 101 that generates three-phase pulse width modulation (PWM) outputs by a plurality of high-frequency output switching devices Tr1, Tr2, Tr3, Tr4, Tr5, and Tr6, a motor 102 installed in an electric compressor (not shown), a drive circuit 103, a microcomputer 104, an operational amplifier AMP, and current transformers 105 and 106 for detecting currents passing through the motor 102. The microcomputer 104 generates drive signals to cause the motor 102 to continuously rotate, and drives the inverter 101 through the intermediary of the drive circuit 103. The inverter 101 generates three-phase PWM substantially sinusoidal waveforms, using a series connection point, as an output, of each pair of the switching devices Tr1 and Tr4, Tr2 and Tr5, and Tr3 and Tr6 that are connected in parallel to the power source Vcc1, thereby continuously running the motor 102 at a predetermined number of revolutions.

The currents of two phases, namely, the current output between the switching devices Tr1 and Tr4 and the current output between the switching devices Tr2 and Tr5 are detected by the current transformers 105 and 106. The detection outputs are amplified by the operational amplifiers AMP and AMP, then supplied to the microcomputer 104. The microcomputer 104 presumes the position of the rotor of the motor 102 on the basis of the detection outputs of the current transformers 105 and 106, controls the drive circuit 103 to drive the inverter 101, and generates the three-phase PWM substantially sinusoidal waveforms to rotatively control the motor 102.

If the detection outputs of the current transformers 105 and 106 are higher than a preset value, i.e., if overcurrent flows from the inverter 101 to the motor 102, the microcomputer 104 controls the drive circuit 103 to stop the inverter 101 and also stop the motor 102 so as to protect the inverter 101 and the motor 102 from overcurrent.

Thus, in the prior art, the output currents of the inverter 101 are detected by the current transformers 105 and 106 to presume the position of the rotor of the motor 102 and to protect the motor 102 from overcurrent. The current transformers, however, are expensive; therefore, as shown in FIG. 10, current transformers for only two phases are usually inserted, and the microcomputer 104 has to compute a formula $I_T=-(I_R+I_S)$ to calculate the current value for the remaining one phase (e.g., T phase).

SUMMARY OF THE INVENTION

The present invention has been made with a view toward solving the problem with the prior art, and it is an object of the invention to provide a protecting apparatus capable of securely and inexpensively effecting protection of an inverter from overcurrent.

According to one aspect of the present invention, there is provided a protecting apparatus that is applied to an inverter constituted by a plurality of switching devices connected between an anode and a cathode of a DC power source, and includes a plurality of detecting devices that convert the currents passing through the plurality of switching devices into voltages and generate detection outputs, a plurality of comparing devices that receive the detection outputs of the detection devices and generate an abnormality output if the absolute values of the detection outputs exceed a predetermined value, and a protecting device that interrupts the drive of all the switching devices if any of the comparing devices generates the abnormality output.

In a preferred form of the present invention, the inverter is constructed of a plurality of pairs of the switching devices connected in parallel between the anode and the cathode of the DC power source, each of the pairs being formed of the switching devices connected in series. The inverter uses, as outputs, the connection points of the switching devices of the pairs mentioned above to convert DC to AC. The detecting devices convert the currents passing through the pairs of switching devices connected to the cathode into voltages, and generate detection outputs.

In another preferred form, the protecting device interrupts the drive of the switching devices if an abnormal output from the comparing devices occurs and lasts for a predetermined period of time.

In yet another preferred form, if the drive of the switching devices is interrupted, the protecting device maintains the interruption state until a predetermined release instruction is issued.

In still another preferred form, the detection outputs of the detecting devices are the information for detecting the condition of a motor driven by the inverter.

In a further preferred form, the motor is a synchronous motor having a permanent magnet in its rotor.

In another preferred form, the motor is a synchronous induction motor having a permanent magnet in its rotor.

In another preferred form, the motor is an induction motor.

DETAILED DESCRIPTION OF THE PREFERRED EMBODIMENTS

Figure 1:
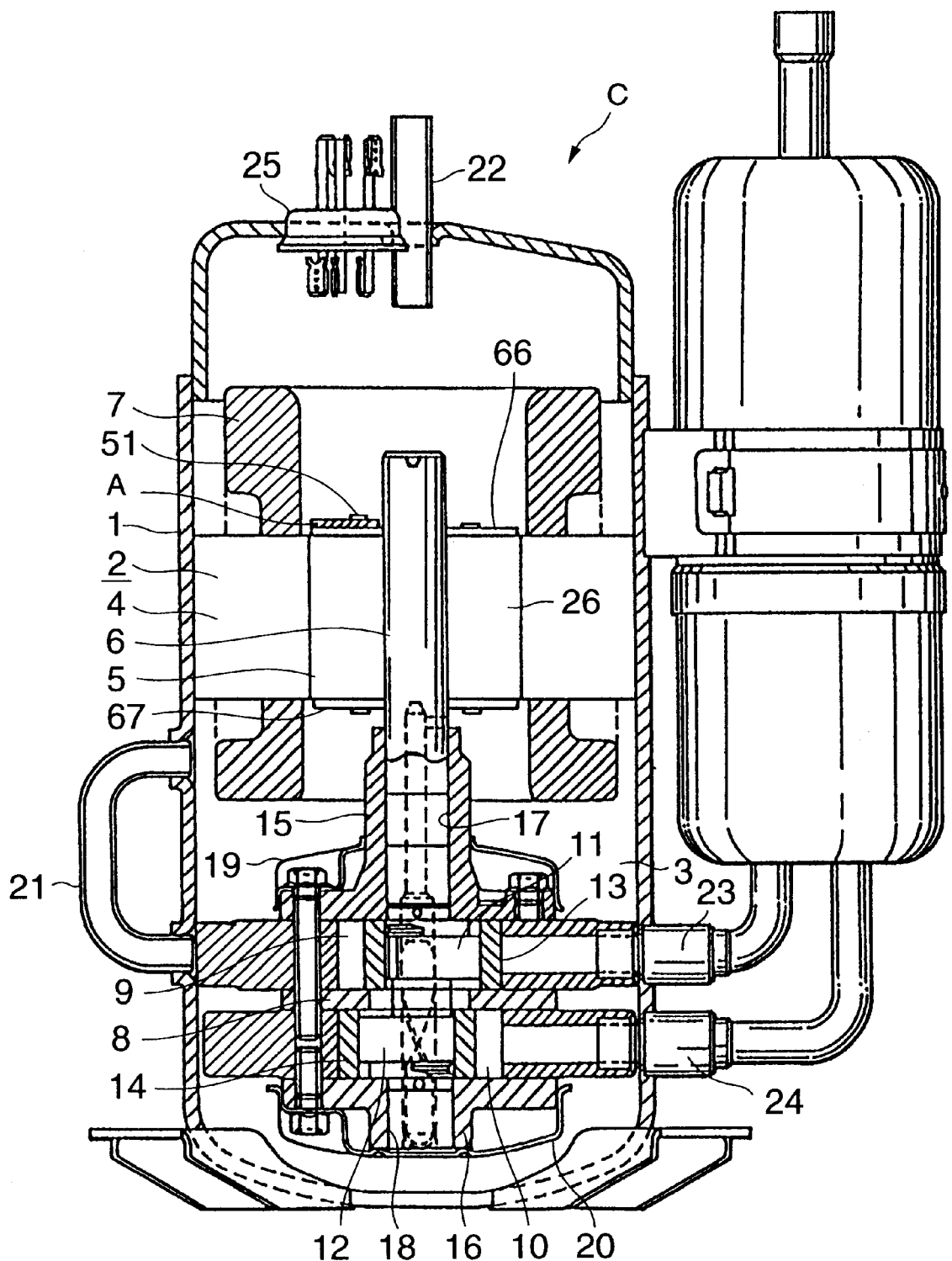
FIG. 1 is a longitudinal sectional side view of a hermetic electric compressor provided with a synchronous motor to which the inverter protecting apparatus in accordance with the present invention has been applied.

The following will describe an embodiment according to the present invention in detail with reference to the accompanying drawings. FIG. 1 is a longitudinal sectional side view of a hermetic electric compressor C equipped with a synchronous motor 2 as an embodiment to which the inverter protecting apparatus in accordance with the present invention will be applied. A hermetic vessel 1 in FIG. 1 includes a synchronous motor (brushless DC motor) 2 as the motor housed in an upper compartment thereof and a compressing unit 3 in a lower compartment thereof, the compressing unit 3 being rotatively driven by the synchronous motor 2. The hermetic vessel 1 is split into two parts in advance to house the synchronous motor 2 and the compressing unit 3, then hermetically sealed by high-frequency welding or the like.

The synchronous motor 2 is constructed of a stator 4 secured to the inner wall of the hermetic vessel 1 and a rotor 5 which is located on the inner side of the stator 4 and rotatively supported around a rotating shaft 6. The stator 4 is provided with a stator winding 7 for applying a rotational magnetic field to the rotor 5.

The compressing unit 3 has a first rotary cylinder 9 and a second rotary cylinder 10 separated by a partitioner 8. The cylinders 9 and 10 have eccentric members 11 and 12 rotatively driven by the rotating shaft 6. The eccentric positions of the eccentric members 11 and 12 are phase-shifted from each other by 180 degrees.

A first roller 13 located in the cylinder 9 and a second roller 14 located in the cylinder 10 rotate in the cylinders as the eccentric members 11 and 12 rotate. Reference numerals 15 and 16 denote a first frame member and a second frame member, respectively. The first frame member 15 forms a closed compression space of the cylinder 9 between itself and the partitioner 8. Similarly, the second frame member 16 forms a closed compression space of the cylinder 10 between itself and the partitioner 8. The first frame member 15 and the second frame member 16 are equipped with bearings 17 and 18, respectively, that rotatively support the bottom of the rotating shaft 6.

Discharge mufflers 19 and 20 are installed so as to cover the first frame member 15 and the second frame member 16. The cylinder 9 and the discharge muffler 19 are in communication through a discharge aperture (not shown) provided in the first frame member 15. Similarly, the cylinder 10 and the discharge muffler 20 are also in communication through a discharge aperture (not shown) provided in the second frame member 16. A bypass pipe 21 provided outside the hermetic vessel 1 is in communication with the interior of the discharge muffler 20.

A discharge pipe 22 is provided at the top of the hermetic vessel 1. Suction pipes 23 and 24 are connected to the cylinders 9 and 10, respectively. A hermetic terminal 25 supplies electric power to the stator winding 7 of the stator 4 from outside the hermetic vessel 1. The lead wire connecting the hermetic terminal 25 and the stator winding 7 is not shown.

Figure 2:
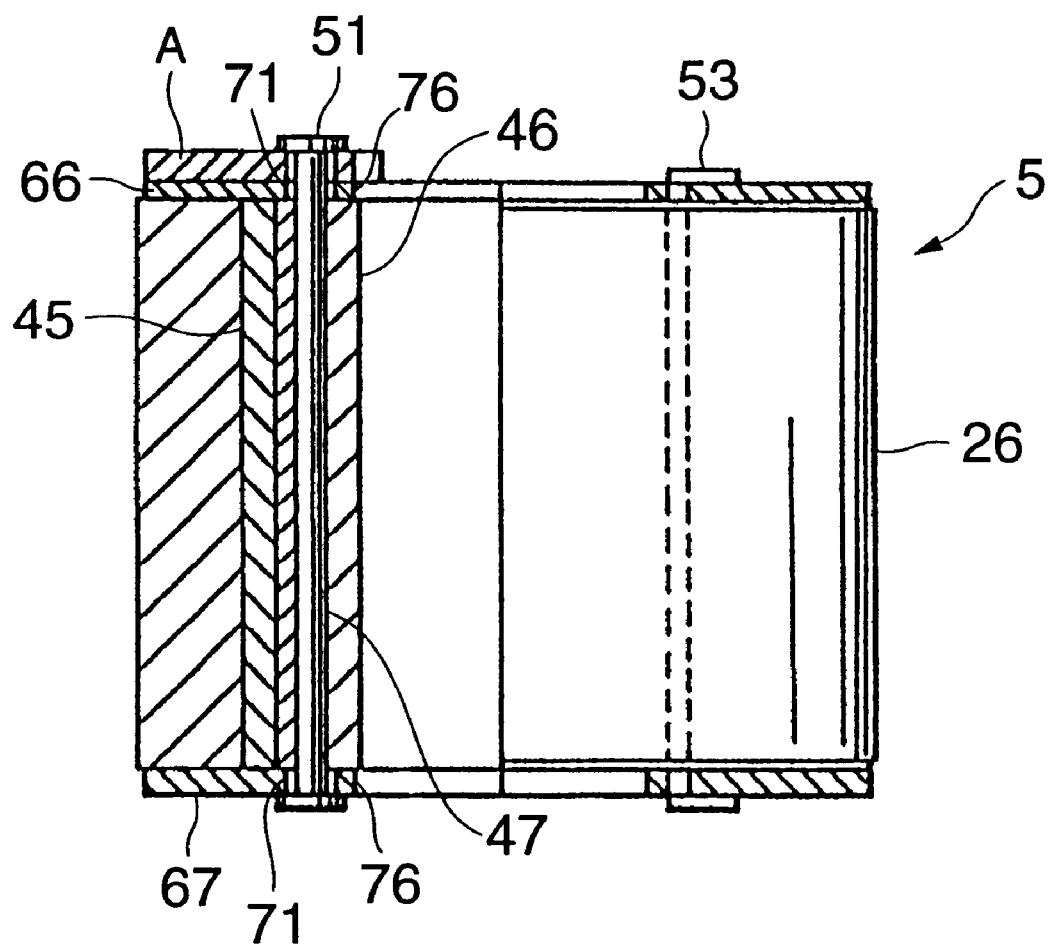
FIG. 2 is a partial longitudinal sectional side view of a rotor in accordance with the present invention.
Figure 3:
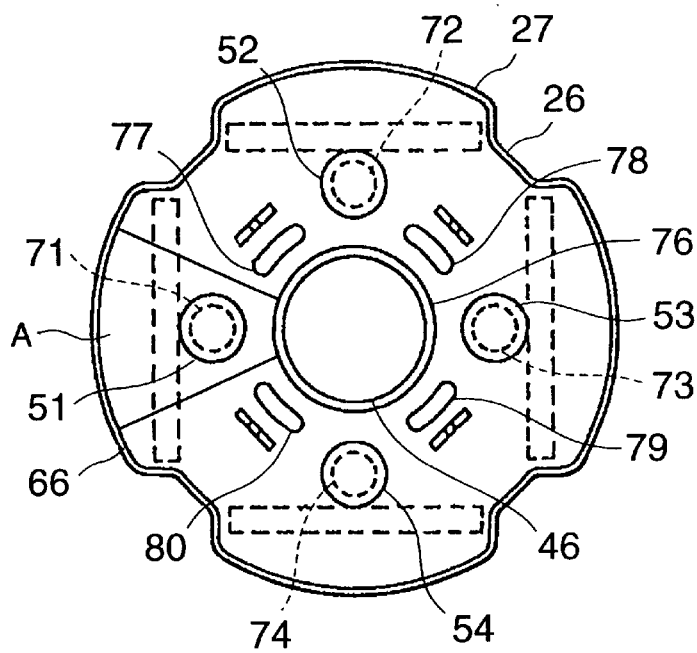
FIG. 3 is a top plan view of the rotor in accordance with the present invention.

FIG. 2 is a partial longitudinal sectional side view of the rotor 5 shown in FIG. 1, and FIG. 3 is a top plan view illustrating a state before the rotor 5 is forcibly fitted to the rotating shaft 6. Reference numeral 26 shown in both drawings denotes a rotor iron core formed by laminating a plurality of rotor iron sheets 27 made by punching electromagnetic steel sheets having a thickness of 0.3 mm to 0.7 mm into the shape shown in FIG. 4, and swaging the laminated rotor iron sheets 27 into one piece or welding into one piece rather than swaging.

Figure 4:
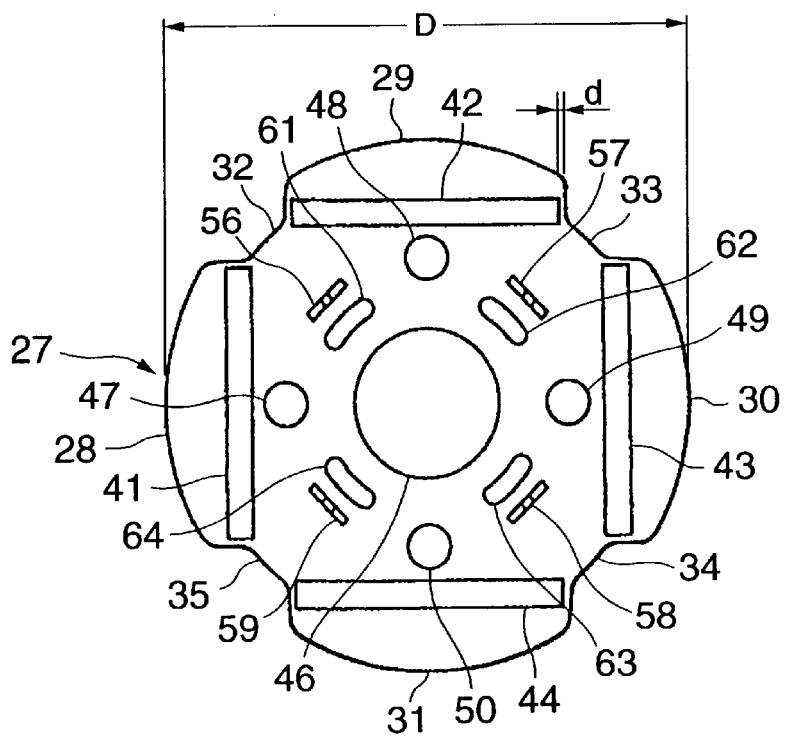
FIG. 4 is a top plan view of a rotor iron plate constituting the rotor in accordance with the present invention.

As shown in FIG. 4, the rotor iron sheets 27 are punched from electromagnetic steel sheets so as to form salient poles 28 through 31 constituting the four magnetic poles. Reference numerals 32 through 35 denote notches provided between the salient poles 28 through 31. An outside diameter D between the apexes of the salient poles 28 through 31 ranges from 40 mm to 70 mm. The outside diameter D is, for example, 50 mm in this embodiment.

Reference numerals 41 through 44 denote insertion holes in which permanent magnets 45, which will be discussed hereinafter, are to be forcibly fitted. The insertion holes 41 through 44 correspond to the salient poles 28 through 31, and are provided concentrically around the axis of the rotating shaft 6. A narrow path width d between each of the insertion holes 41 through 44 and the side wall of each of the salient poles 28 through 31 adjacent to the insertion holes 41 through 44 ranges from 0.3 mm or more but below 0.5 mm.

A hole 46 is formed at the center of the rotor iron sheets 27, the rotating shaft 6 being shrink-fitted into the hole 46. Through holes 47 through 50 that have a size and a shape that accommodate rivets 51 through 54 for riveting, which will be discussed hereinafter, are provided on the inner side from the insertion holes 41 through 44 such that they correspond to the insertion holes 41 through 44. Swaging portions 56 through 59 for securing the rotor iron sheets 27 by swaging them together are formed nearly concentrically with the through holes 47 through 50, and are formed among the insertion holes 41 through 44. Reference numerals 61 through 64 denote holes for forming oil paths that are provided on the inner side from the swaging portions 56 through 59.

Figure 5:
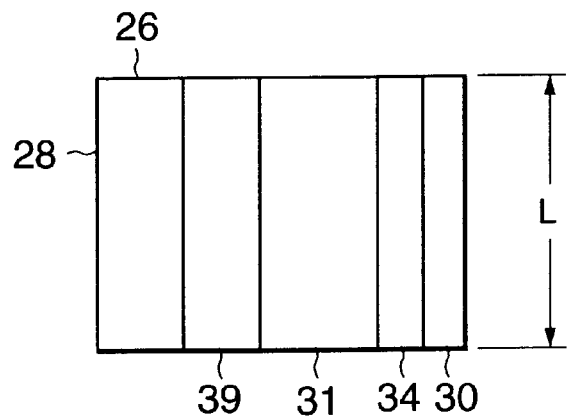
FIG. 5 is a side view of a rotor iron core constituting the rotor in accordance with the present invention.

A plurality of the rotor iron sheets 27 are laminated and swaged together at the swaging portions 56 through 59 thereby to form the rotor iron core 26 shown in the side view of FIG. 5. In this embodiment, the outside diameter of the rotor iron core 26 is the outside diameter D (50 mm) of the rotor iron sheets 27 mentioned above, and a laminating dimension L in the direction of the rotating shaft 6 is, for example, 40 mm. A ratio L/D of the outside diameter D to the dimension L is set to be smaller than 1.1 (0.8 in this embodiment), so that the dimension L in the direction of the rotating shaft 6 is smaller.

Figure 6:
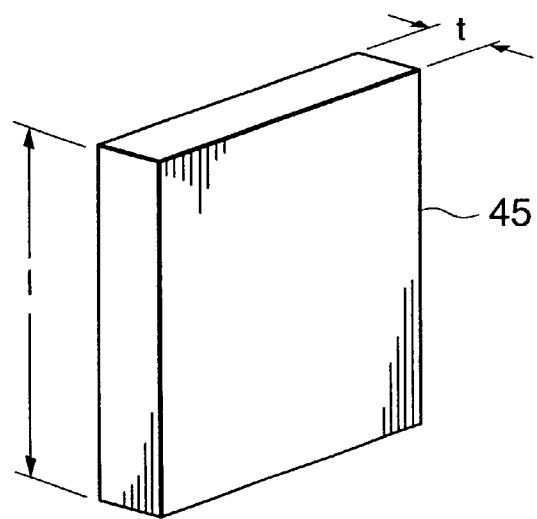
FIG. 6 is a perspective view of a permanent magnet constituting the rotor in accordance with the present invention.

The permanent magnets 45 are made of a rare earth type permanent magnet material of, for example, a praseodymium type permanent magnet, a neodymium type permanent magnet with nickel plating or the like provided on the surface thereof, or a ferrite material so as to exhibit high magnet performance in a low magnetizing magnetic field. The permanent magnets 45 are square, as shown in FIG. 6. A thickness t of the permanent magnets 45 is set to, for example, 2.65 mm, and a dimension I thereof in the direction of the rotating shaft 6 is set to 40 mm, which is the same as the aforesaid dimension L. A ratio of the thickness t to the dimension I, t/I, is set to be smaller than 0.08. In this embodiment, the ratio t/I is 0.066. The insertion holes 41 through 44 are formed to have the size for the permanent magnets 45 to be tightly press-fitted therein. Demagnetization during operation can be restrained by using such ferrite magnets or rare earth type magnets that have a coercive force of 1350 to 2150 kA/m at normal temperature and a coercive force temperature coefficient of −0.7%/° C. or less.

Plane-like end surface members 66 and 67 are installed at the top and bottom ends of the rotor iron core 26, and are made of a nonmagnetic material, such as aluminum or resin, being formed to have substantially the same shape as the aforesaid rotor iron sheets 27. The outside diameters of the end surface members 66 and 67 are set to be identical to or slightly smaller than the outside diameter D of the rotor iron core 26. The end surface members 66 and 67 are provided with through holes 71 through 74 at the positions associated with the through holes 47 through 50, and with a hole 76 and holes 77 through 80 at the positions associated with the hole 59 and 61 through 64.

The permanent magnets 45 are press-fitted into the insertion holes 41 through 44 of the rotor iron core 26, then the top and bottom end surface members 66 and 67 are installed to cover the top and bottom of the insertion holes 41 through 44. In this state, the through holes 47 to 50 and 71 to 74 penetrate the rotor iron core 26 and the end surface members 66 and 67 along the rotating shaft 6. The holes 61 through 64 and the holes 77 through 80 penetrate the rotor iron core 26 and the end surface members 66 and 67. Thereafter, the rivets 51 through 54 are inserted in the through holes 47 to 50 and the through holes 71 to 74, and the assembly is vertically swaged into one piece. A balance weight A is fixed to the rotor iron core 26 by a rivet 51 together with the upper end surface member 66.

In the configuration described above, when a stator winding 7 is energized by an inverter 90, which will be discussed hereinafter, of a stator 4, the repulsion and attraction relative to the magnetic field produced by the permanent magnets 45 causes the rotor 5 to rotate clockwise in FIG. 4 at a speed at which the voltage applied to the stator winding 7 and a load is balanced (the speed being changed, for example, within the range of 500 rpm to 10000 rpm by changing an applied voltage), as mentioned above.

Figure 7:
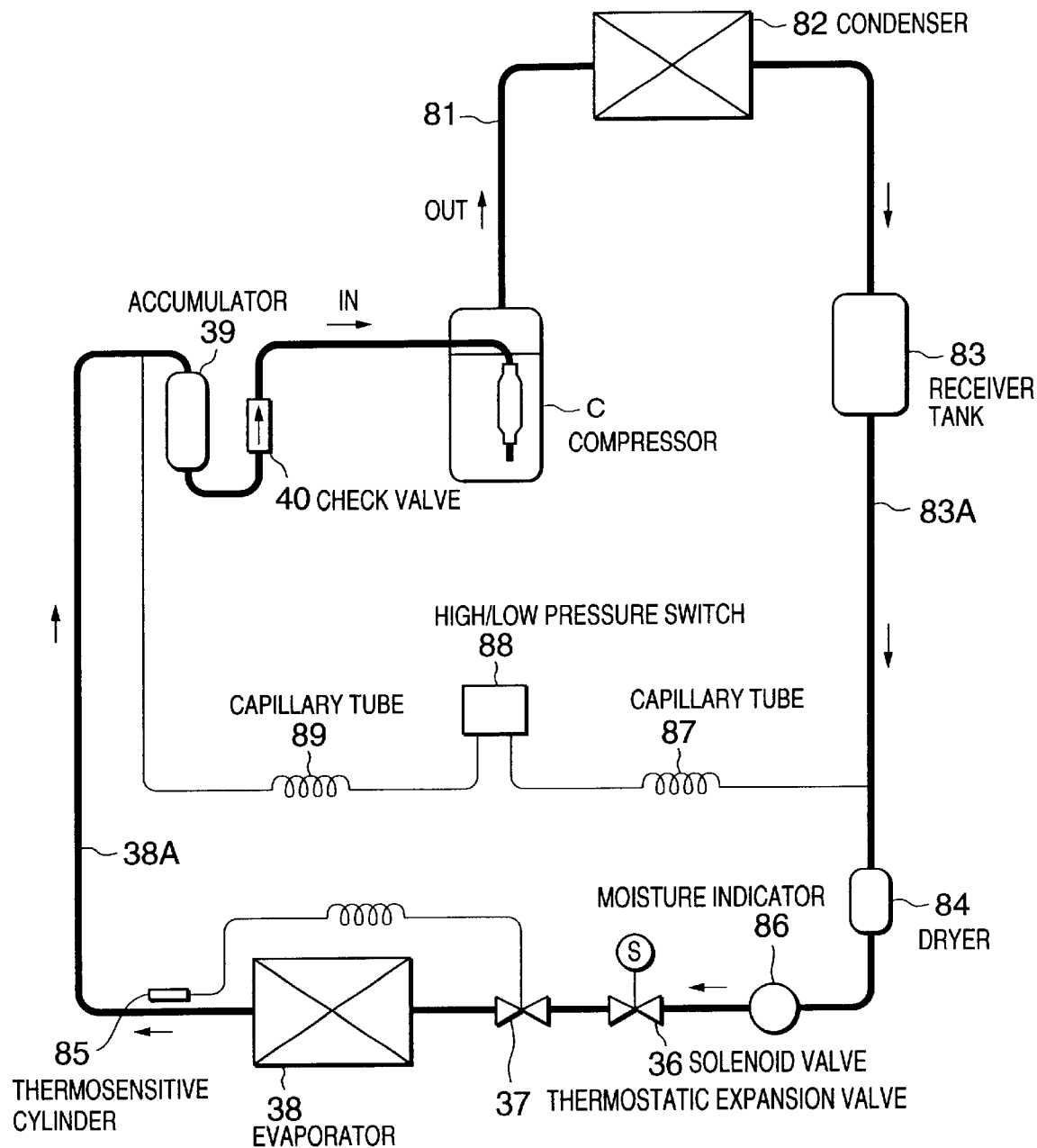
FIG. 7 is a refrigerant circuit diagram of an air conditioner or an electric refrigerator or the like that uses the hermetic electric compressor shown in FIG. 1.

The hermetic electric compressor C provided with the synchronous motor 2 set forth above is used in a refrigerant circuit (FIG. 7) of an air conditioner or an electric refrigerator or the like. Thus, an air conditioner carries out the air conditioning in a room, or an electric refrigerator cools the interior thereof. More specifically, when the compressing unit 3 in the hermetic electric compressor C is driven, a refrigerant sealed in the refrigerant circuit is drawn in through a suction pipe 23, compressed by the first rotary cylinder 9 and the second rotary cylinder 10, and discharged into a pipe 81 from a discharge pipe 22. The compressed gas refrigerant discharged into the pipe 81 flows into a condenser 82 where it radiates heat and is condensed into a liquid refrigerant, then flows into a receiver tank 83.

The liquid refrigerant that flows into and temporarily stays in the receiver tank 83 passes from a pipe 83A at the outlet side of the receiver tank 83 to a dryer 84, a moisture indicator 86, a solenoid valve 36, and a thermostatic expansion valve 37 wherein it is throttled. Then, the liquid refrigerant flows into an evaporator 38 where it evaporates. At this time, the refrigerant absorbs heat around it to effect its cooling action. When the refrigerant almost liquefies, the refrigerant runs from a pipe 38A at the outlet side of the evaporator 38 into an accumulator 39 where it undergoes vapor-liquid separation, then it is drawn back into the compressing unit 3 again through a check valve 40. This refrigerating cycle is repeated.

The liquid refrigerant that has left the receiver tank 83 is branched off from the pipe 83A into an accumulator 39 from the pipe 38A between the evaporator 38 and the accumulator 39 via a capillary tube 87, a high/low pressure switch 88, and a capillary tube 89. The high/low pressure switch 88 detects the pressures of the pipe 83A and the pipe 38A through the capillary tubes 87 and 43. If the pressures of the two pipes 83A and 38A exceed a predetermined pressure difference or more, resulting in an insufficient amount of the refrigerant drawn into the compressing unit 3, then the liquid refrigerant from the receiver tank 83 is allowed to flow into the compressing unit 3 to protect the compressing unit. The thermostatic expansion valve 37 automatically adjusts its opening degree on the basis of the temperature detected by a thermosensitive cylinder 85 provided at the outlet end of the evaporator 38.

Figure 8:
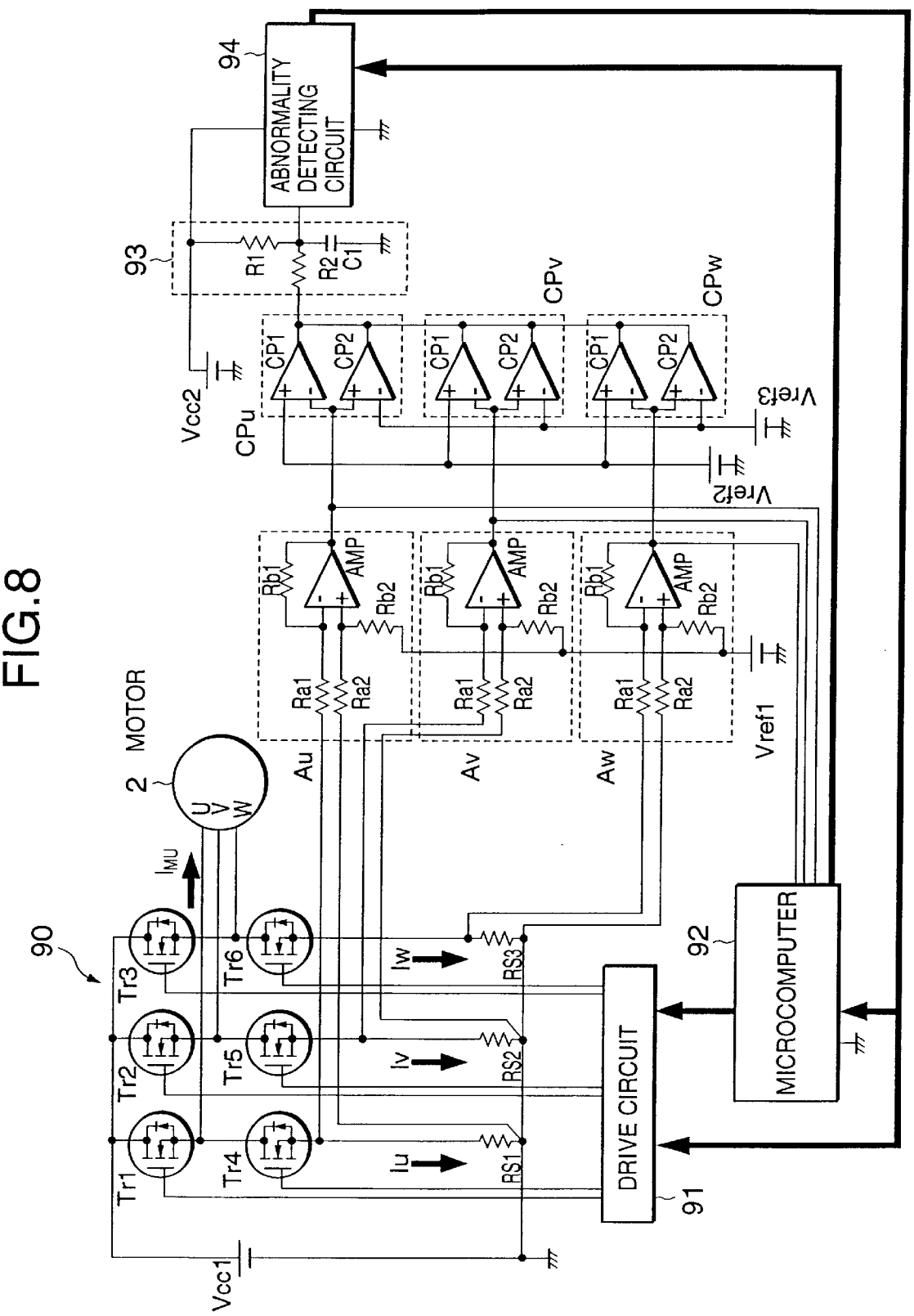
FIG. 8 is an electric circuit diagram of a synchronous motor of the hermetic electric compressor shown in FIG. 1.

FIG. 8 shows an electrical circuit diagram of the synchronous motor 2. Referring to FIG. 8, Vcc1 denotes a DC power source obtained by rectifying a commercial power source of 200VAC, 50 Hz/60 Hz or the like by a rectifier (not shown). The DC power source Vcc1 is connected to the stator winding 7 of a three-phase synchronous motor 2 having U-phase, V-phase, and W-phase through the intermediary of the inverter 90. The inverter 90 is formed of a plurality of (six in this embodiment) switching devices (high-frequency output switching devices) Tr1, Tr2, Tr3, Tr4, Tr5, and Tr6 constructed of field-effect transistors (FETs) having reflux diodes for obtaining three-phase substantially sinusoidal waveforms for driving the synchronous motor 2. The inverter 90 is controlled by a drive circuit 91 and a microcomputer 92.

The switching devices Tr1 and Tr4 are connected in series to be paired, the switching device Tr1 being connected to the anode of the DC power source Vcc1 and the switching device Tr4 being connected to the cathode of the DC power source Vcc1. Likewise, the switching devices Tr2 and Tr5 are connected in series to be paired, the switching device Tr2 being connected to the anode of the DC power source Vcc1 and the switching device Tr5 being connected to the cathode of the DC power source Vcc1. Likewise, the switching devices Tr3 and Tr6 are connected in series to be paired, the switching device Tr3 being connected to the anode of the DC power source Vcc1 and the switching device Tr6 being connected to the cathode of the DC power source Vcc1. Furthermore, the connection point of the switching device Tr1 and the switching device Tr4 of the inverter 90 serves as an output connected to the U-phase of the stator winding 7 of the synchronous motor 2. The connection point of the switching device Tr2 and the switching device Tr5 serves as an output connected to the V-phase of the synchronous motor 2. The connection point of the switching device Tr3 and the switching device Tr6 serves as an output connected to the W-phase of the synchronous motor 2.

In this case, the switching device Tr4 is connected to the DC power Vcc1 via a resistor RS1, the switching device Tr5 is connected to the DC power source Vcc1 via a resistor RS2, and the switching device Tr6 is connected to the DC power source Vcc1 via a resistor RS3. these resistors RS1, RS2, and RS3 constitute a detecting device. The gates or the switching device Tr1, Tr2, Tr3, Tr4, Tr5, and Tr6 are connected to the drive circuit 91, and the drive circuit 91 is connected to the microcomputer 92.

The terminal voltage of the resistor RS1, that is, the voltage at the connection point of the switching device Tr4 and the resistor RS1, is supplied to the minus input terminal (inversion input terminal) of the operational amplifier AMP via a resistor Ra1 of an amplifier circuit Au. The terminal voltage of the resistor RS2, that is, the voltage at the connection point of the switching device Tr5 and the resistor RS2, is supplied to the minus input terminal of the operational amplifier AMP via a resistor Ra1 of an amplifier circuit Av. The terminal voltage of the resistor RS3, that is, the voltage at the connection point of the switching device Tr6 and the resistor RS3, is supplied to the minus input terminal of the operational amplifier AMP via a resistor Ra1 of an amplifier circuit Aw. A reference voltage obtained by dividing a reference power source Vref1 by resistors Rb2 and Ra2 is supplied to the plus input terminals (non-inversion input terminals) of the operational amplifiers AMP of the individual amplifier circuits Au, Av, and Aw. The outputs of the amplifiers AMP are connected to the microcomputer 92. Rb1 denotes a feedback resistor. Thus, the drive circuit of the synchronous motor 2 is constructed.

The currents passing through the switching devices Tr1 through Tr6 of the inverter 90, that is, the currents passing through the individual phases of the stator winding 7 of the synchronous motor 2 are converted into voltages by the resistors RS1 through RS3 and supplied to the operational amplifiers AMP. The operational amplifiers AMP amplify the voltages and output the amplified voltages to the microcomputer 92. The microcomputer 92 presumes the position of the rotor 5 of the synchronous motor 2 on the basis of the outputs of the operational amplifiers AMP, and outputs a control signal to the drive circuit 91. The drive circuit 91 drives the gates of the switching devices Tr1, Tr2, Tr3, Tr4, Tr5, and Tr6 on the basis of the outputs of the microcomputer 92, and outputs the three-phase PWM substantially sinusoidal waveform to the phases (R-phase, S-phase, and T-phase) of the stator winding 7 of the synchronous motor 2. In this case, the microcomputer 92 drives the inverter 90 to apply the three-phase PWM substantially sinusoidal waveform to the stator winding 7 (R-phase, S-phase, and T-phase) of the synchronous motor 2 by sequentially shifting the phase, thereby generating a rotating circular magnetic field to rotate the rotor 5. The revolution of the synchronous motor 2 drives the compressing unit 3 in the hermetic electric compressor C, thus causing an air conditioner to effect the air conditioning in a room, or an electric refrigerator to cool the interior thereof.

The amplifier circuits Au, Av, and Aw, together with the resistors RS1 through RS3, make up a detecting device. The detecting device detects the terminal voltages of the resistors RS1, the resistor RS2, and the resistor RS3 of the inverter 90. The amplifier circuits Au, Av, and Aw receive and amplify the detected terminal voltages of the resistors RS1, RS2, and RS3, and output the results. The microcomputer 92 receives the detection signals amplified and output by the amplifier circuits Au, Av, and Aw thereby to detect the currents passing through the U-phase, the V-phase, and the W-phase of the synchronous motor 2, and also to calculate the rotational position of the rotor 5 on the basis of the signals output by the amplifier circuits Au, Av, and Aw.

The inverter 90 controls the switching devices Tr1, Tr2, Tr3, Tr4, Tr5, and Tr6 through the intermediary of the drive circuit 91 from the rotational position calculated by the microcomputer 92. The inverter 90 then outputs drive waveforms and applies the three-phase PWM substantially sinusoidal waveforms of a predetermined frequency to the three phases (R-phase, S-phase, and T-phase) of the synchronous motor 2 while sequentially shifting the phase so as to drivably control the synchronous motor 2 at a predetermined number of revolutions. In other words, the microcomputer 92 detects the currents passing through the three phases (R-phase, S-phase, and T-phase) of the synchronous motor 2 to detect the positional information regarding the rotor 5 so as to drivably control the synchronous motor 2 at a predetermined number of revolutions.

The protective operation of the inverter 90 in accordance with the present invention will now be described. As the protective measures for the inverter, window comparators CPu, CPv, and CPw as comparing devices, and an abnormality detecting circuit 94 are provided. The outputs of the operational amplifiers AMP of the amplifier circuits Au, Av, and Aw are connected to the window comparators CPu, CPv, and CPw. Each of the window comparators CPu through CPw is constructed of open-collector output type comparators CP1 and comparator CP2. Each of the window comparators CPu through CPw has an input section wherein a minus input terminal of the comparator CP1 and a plus input terminal of the comparator CP2 are connected and an output section wherein the outputs of the comparator CP1 and the comparator CP2 are connected.

The plus input terminal of the comparator CP1 of the window comparators CPu through CPw is connected to a reference power source Vref2, and the minus input terminal of the comparator CP2 is connected to a reference power source Vre3. The threshold values of the window comparators CPu through CPw are set by these reference power sources Vref2 and the reference power source Vref3.

The output sections of the window comparators CPu, CPv, and CPw are interconnected and further connected to the abnormality detecting circuit 94 through the intermediary of a time constant circuit 93 constructed of resistors R1 and R2 and a capacitor Cl. Reference character Vcc2 denotes the power source of the time constant circuit 93 of the abnormality detecting circuit 94. The output of the abnormality detecting circuit 94 is connected to the microcomputer 92 and the drive circuit 91. The microcomputer 92 and the drive circuit 91 make up the protecting device in the present invention. The time constant circuit 93 functions to prevent the abnormality detecting circuit 94 from reacting to a momentary overcurrent of approximately a few microseconds that occurs when the switching devices Tr1 to Tr6 are turned ON or OFF.

The operation will now be described. When the synchronous motor 2 is started, causing a current Iu to pass through the resistor RS1, a voltage of the current Iu times the resistor RS1 appears at both ends of the resistor RS1 constituting the detecting device. The voltage is amplified by the amplifier circuit Au. Similarly, the voltages at the resistors RS2 and RS3 are amplified by the amplifier circuits Av and Aw. Outputs $V_{AU}$, $V_{AV}$ and $V_{AW}$ of the amplifier circuits Au, Av, and Aw in this case can be represented by the following expressions, where the resistor Ra1=Ra2=Ra and the resistor Rb1=Rb2=Rb:

$$V_{Au}=-(Rb/Ra)(Iu \times RS1)+Vref1 \qquad (1)$$

Similarly, the output $V_{AV}$ of the amplifier circuit Av is obtained by:

$$V_{Av}=-(Rb/Ra)(Iv \times RS2)+Vref1 \qquad (2)$$

The output $V_{AW}$ of the amplifier circuit Aw is obtained by:

$$V_{Aw}=-(Rb/Ra)(Iw \times RS3)+Vref1 \qquad (3)$$

The outputs $V_{Au}$, $V_{AV}$, and $V_{Aw}$ of the amplifier circuits Au, Av, and Aw are supplied to the input sections of the window comparators CPu, CPv, and CPw.

The operation will now be described, taking the window comparator CPu as an example. The window comparator CPu is constructed of the open-collector output type comparator CP1 and the comparator CP2. When the voltage applied to the plus input terminal (non-inversion input terminal) of the comparator CP1 is denoted by Vref2, and the voltage applied to the minus input terminal (inversion input terminal) of the CP2 is denoted by Vref3, the following expressions are given:

$$Vref3 < Vref1 < Vref2 \quad (4)$$

$$(Vref1 - Vref3) = (Vref2 - Vref1) \quad (5)$$

where the relationship between $V_{Au}$, Vref2, Vref3 and the output of the CPu is such that, if Vref3<$V_{Au}$<Vref2, then the output of the CPu is High, and if Vref3>$V_{Au}$ or $V_{Au}$>Vref2, then the output of the CPu is Low.

The relationship represented by expression (1) above indicates that if the absolute value of the current Iu is a predetermined value (preset value) or less, then the output section of the window comparator CPu is set to High, while the output section of the window comparator CPu is set to Low if the absolute value of the current Iu exceeds the predetermined value (preset value). The comparators CPv and CPw act the same.

All output sections of the window comparators CPu, CPv, and CPw are connected so as to supply the outputs to the time constant circuit 93. The output of the time constant circuit 93 is supplied to the abnormality detecting circuit 94. If all the absolute values of the currents Iu, Iv, and Iw passing through the resistors RS1, RS2, and RS3 after the inputs are the preset value or less, then the input signal of the abnormality detecting circuit 94 goes High. If any of the absolute values of the currents Iu, Iv, and Iw exceeds the preset value for a few microseconds or longer, then the input signal of the abnormality detecting circuit 94 goes Low. Furthermore, when the input of the abnormality detecting circuit 94 is High, then a signal for causing the drive circuit 91 to perform normal operation is issued.

The inverter 90 drives the switching devices Tr1, Tr2, Tr3, Tr4, Tr5, and Tr6 through the intermediary of the drive circuit 91 from the position of the rotor 5 calculated by the microcomputer 92 to apply the three-phase PWM substantially sinusoidal waveforms of a predetermined frequency to the three phases (R-phase, S-phase, and T-phase) of the synchronous motor 2 while sequentially shifting the phase so as to drive the synchronous motor 2 at a predetermined number of revolutions. If the input goes Low even once, the abnormality detecting circuit 94 outputs a signal for interrupting the operation of the drive circuit 91, and holds the interrupted state of the drive circuit 91. This causes the drive circuit 91 to interrupt the drive of all the switching devices Tr1, Tr2, Tr3, Tr4, Tr5, and Tr6 and the drive of the synchronous motor 2, independently of a control signal of the microcomputer 92.

Figure 9:
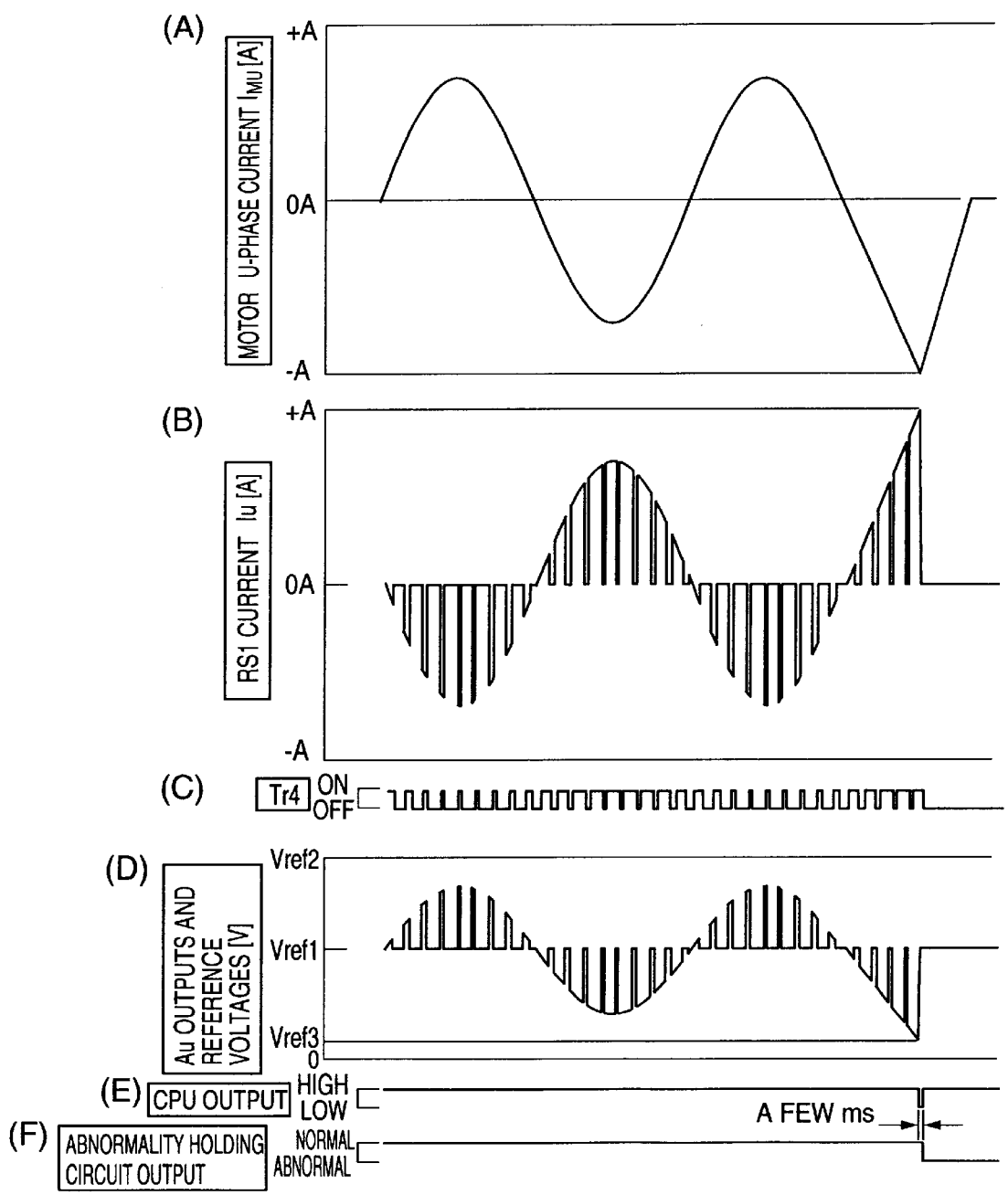
FIG. 9 shows graphs illustrating the voltages of sections to explain a protective operation.
Figure 10:
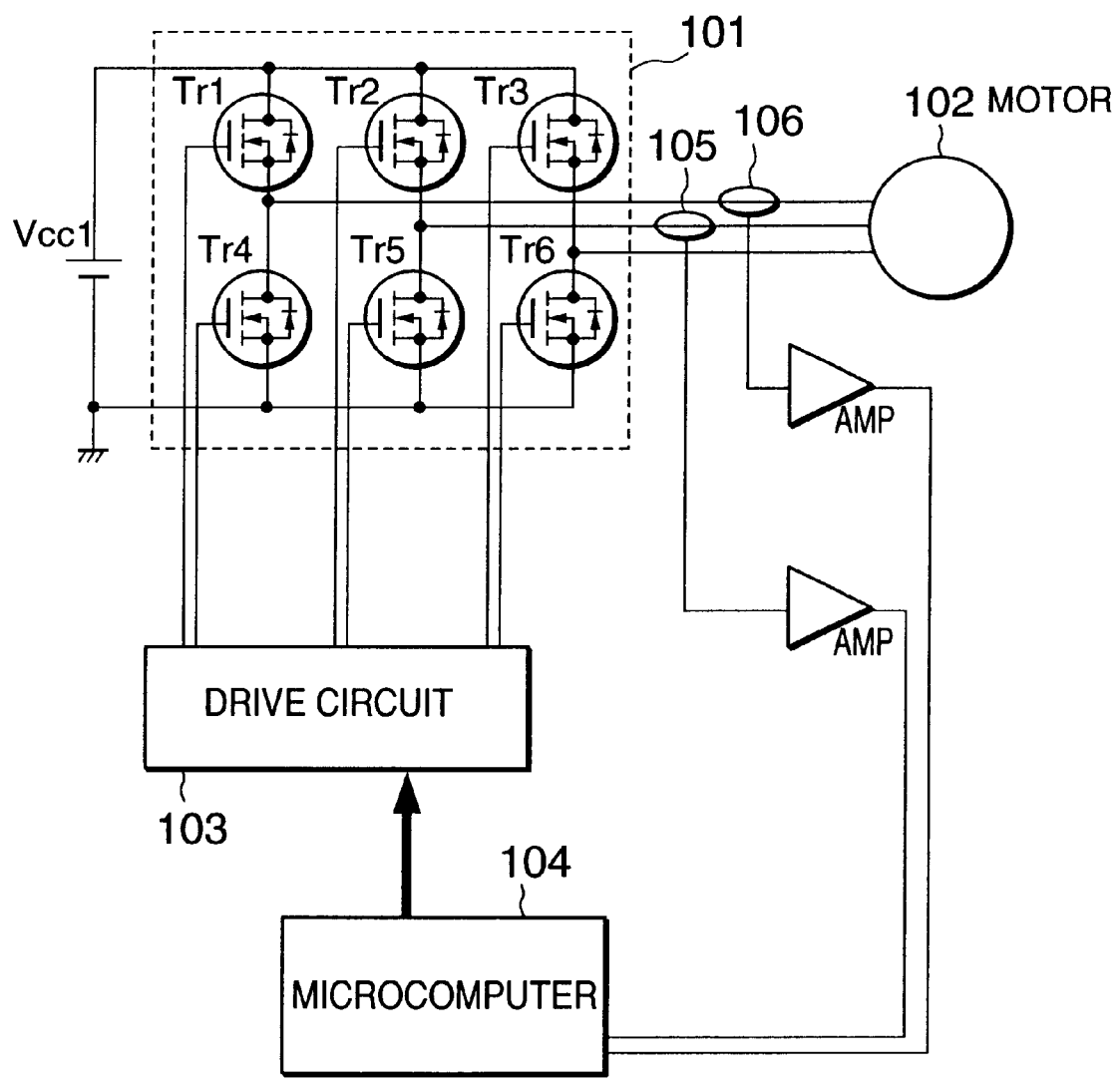
FIG. 10 is an electric circuit diagram of a conventional synchronous motor.

In other words, if any of the currents Iu, Iv, and Iw exceeds the preset value for a few microseconds or longer even once, the abnormality detecting circuit 94 interrupts the drive of the switching devices Tr1, Tr2, Tr3, Tr4, Tr5, and Tr6, and maintains the interrupted state. This relationship is illustrated in FIG. 9. In the drawing, the current values within the range defined by (+A) and (−A) are considered to be normal current levels at which the rare earth type permanent magnets 45 provided in the rotor 5 are not demagnetized when the synchronous motor 2 becomes hot. The current levels out of the defined range are considered as the levels requiring protection. FIG. 9A through FIG. 9F illustrate the waveforms observed when a U-phase current $I_{MU}$ of the synchronous motor 2 increases from a normal level and reaches the protection level "−A" for some reason.

FIG. 9A illustrates the U-phase current $I_{MU}$ of the synchronous motor 2, the direction in which the current flow into the synchronous motor 2 is denoted by "+". FIG. 9B illustrates the current Iu passing through the resistor RS1, the direction in which the current flows from the switching device Tr4 to the resistor RS1 being denoted by "+". FIG. 9C illustrates the ON/OFF state of the switching device Tr4. The current in the positive direction flows into the switching device Tr4, while the current in the negative direction flows into a reflux diode incorporated in the switching device Tr4. During the period of time in which the switching device Tr4 is OFF, the switching device Tr1 is ON, and no current passes through the switching device Tr4. During the period of time in which the switching device Tr4 is ON, $|I_{MU}|=|Iu|$.

FIG. 9D illustrates a relationship between the output voltage of the amplifier circuit Au and the reference power sources Vref1, Vref2, and Vref3. If $I_{MU}$=0A, then the output voltage of the amplifier circuit Au equals Vref1. A constant has been set such that the output of the amplifier circuit Au becomes the reference power source Vref3 if the current $I_{MU}$ of the resistor RS1 is at the protection level "+A". The constant has been set such that the output of the amplifier circuit Au becomes the reference power source Vref2 if the current $I_{MU}$ of the resistor RS1 is at the protection level "−A". FIG. 9E shows the outputs of the window comparator CPu, and FIG. 9F shows the outputs of the abnormality detecting circuit 94.

If the current $I_{MU}$ reaches "−A" shown in FIG. 9A for some reason, then the output voltage of the amplifier circuit Au drops down to the reference power source Vref3 shown in FIG. 9D. When the output voltage of the amplifier circuit Au drops down to the reference power source Vref3, the output of the window comparator CPu switches from High to Low, and the Low level is supplied to the time constant circuit 93. If the output Low, which indicates abnormality, of the window comparator CPu supplied to the time constant circuit 93 lasts for a few microseconds or more, which has been decided beforehand by the time constant circuit 93, as shown in FIG. 9E, then the input of the abnormality detecting circuit 94 switches to Low, as shown in FIG. 9F, causing a predetermined signal to be output to the drive circuit 91 and an abnormality signal to be output to the microcomputer 92. This interrupts the drive of all the switching devices Tr1 through Tr6.

Although not shown, when the current $I_{MU}$ reaches "+A", the output voltage of the amplifier circuit Au increases to the reference power source Vref2, as mentioned above. When the output voltage of the amplifier circuit Au increases to the reference power source Vref2, the output of the window comparator CPu switches from High to Low, and a predetermined signal is issued and supplied to the time constant circuit 93. If the Low output of the window comparator CPu supplied to the time constant circuit 93 lasts for a few microseconds or more, which has been decided by the time constant circuit 93 in advance, then the input of the abnormality detecting circuit 94 switches to Low, which indicates an abnormality, the operation of the drive circuit 91 is interrupted, and an abnormality signal is output to the microcomputer 92. This causes all the switching devices Tr1 through Tr6 to be interrupted. The same applies to the currents of the V-phase and the W-phase of the synchronous motor 2, and the protecting feature against overcurrent is activated, making it possible to prevent damage to the switching devices and the synchronous motor 2.

When the motor having the permanent magnets 45 provided in the rotor 5 is the synchronous motor 2 or a synchronous induction motor having a squirrel-cage secondary conductors provided on its rotor (not shown), the current Iu passing through the resistor RS1, the current Iv passing through the resistor RS2, and the current Iw passing through the resistor RS3 are set to a demagnetization limit current of the permanent magnets 45 or less or a failure current or less of the switching devices Tr1 through Tr6, whichever is smaller. This enables the protection of the motor and the switching devices Tr1 through Tr6. If the motor is an induction motor, then the current Iu passing through the resistor RS1, the current Iv passing through the resistor RS2, and the current Iw passing through the resistor RS3 are set to the failure current or less of the switching devices Tr1 through Tr6 to protect the switching devices Tr1 through Tr6. Thus, it is possible to prevent the demagnetization of the permanent magnets 45 incorporated in the motor or to protect the switching devices Tr1 through Tr6 from damage.

The state wherein the Low input (indicating abnormality) of the abnormality detecting circuit 94 is maintained is continued until a predetermined release instruction signal is received from the microcomputer 92. As soon as the output of the inverter 90 is back to normal, the maintained state of the abnormality detecting circuit 94 is released by a release instruction signal from the microcomputer 92. To absorb noises, a high-cut filter may be inserted between the amplifier circuits Au, Av, Aw and the window comparators CPu, CPv, CPw, and between the amplifier circuits Au, Av, Aw and the microcomputer 92. Furthermore, a high-pass attenuation feature may be imparted to the amplifier circuits Au, Av, and Aw themselves. The descriptions have been given of the protection of the U-phase by the abnormality detecting circuit 94; however, the same applies to the V-phase and the W-phase, so that the descriptions thereof will be omitted.

Thus, the inverter protecting apparatus is provided with the plurality of detecting devices (the resistors RS1, RS2, and RS3) that convert the currents passing through the plurality of switching devices Tr1 through Tr6 into voltages and generate detection outputs, and the plurality of comparing devices (the window comparators CPu, CPv, and CPw) that receive the detection outputs of the detecting devices and generates an abnormality output if an absolute value of a detection output exceeds a predetermined value. The protecting devices (the microcomputer 92 and the drive circuit 91) interrupt the drive of all the switching devices Tr1 through Tr6 if any of the comparing devices generates an abnormality output. With this arrangement, it is possible to detect overcurrent flowing into the switching devices Tr1 through Tr6 without using costly current transformers used in a prior art. Hence, the drive of the switching devices Tr1 through Tr6 can be interrupted before a current level at which the switching devices Tr1 through Tr6 are damaged is reached, thereby permitting the protection of the switching devices. Thus, damage to the inverter 90 caused by overcurrent can be prevented.

Moreover, the inverter 90 has the plurality of pairs of switching devices (Tr1 and Tr4, Tr2 and Tr5, and Tr3 and Tr6) connected in parallel between the anode and the cathode of the DC power source Vcc1, each of the pairs being formed of the switching devices connected in series. The inverter 90 uses, as outputs, the connection points of the switching devices of the pairs (Tr1 and Tr4, Tr2 and Tr5, and Tr3 and Tr6) to convert DC to AC. The detecting devices (the resistors RS1, RS2, and RS3, and the amplifier circuits Au, Av, and Aw) convert the currents passing through the switching devices Tr4, Tr5, and Tr6 connected to the cathode into voltages, and generate detection outputs. This arrangement obviates the need for insulating devices, such as insulated amplifiers. Thus, accurate current detection is possible.

Furthermore, the protecting device constructed of the time constant circuit 93, the abnormality detecting circuit 94, and the drive circuit 91 interrupts the drive of the switching devices Tr1 through Tr6 if an abnormal output from the window comparators CPu, CPv, and CPw occurs and lasts for a predetermined period of time. This arrangement makes it possible to prevent an inconvenience in which the inverter 90 is damaged by an abnormality output that occurs and lasts. Thus, the protecting device does not interrupt the drive of the switching devices Tr1 through Tr6 if a short abnormality output occurs, so that the drive of the inverter 90 can be continued without interruption.

If the drive of the switching devices Tr1 through Tr6 is interrupted, the protecting device constructed of the time constant circuit 93 and the abnormality detecting circuit 94, the microcomputer 92, and the drive circuit 91 maintains the interruption state until a predetermined release instruction is issued; hence, it is possible to prevent any further abnormal output of the inverter 90. This arrangement permits secure prevention of damage to the synchronous motor 2 or the inverter 90.

The detection outputs of the detecting devices (the resistors RS1, RS2, and RS3) and the outputs of the amplifier circuits (Au, Av, and Aw) that amplify the detection outputs are the information for detecting the condition of the synchronous motor 2 driven by the inverter 90. This information, therefore, can be used for detecting the position of the rotor 5 of the synchronous motor 2 and for detecting an abnormal current passing through the synchronous motor 2. With this arrangement, it is possible to perform accurate current detection, and to interrupt the drive of the synchronous motor 2 by accurate detection if an abnormal current passes through the synchronous motor 2, thus permitting secure protection of the switching devices Tr1 through Tr6 and the synchronous motor 2 against damage caused by such an abnormal current.

In this embodiment, the inverter protecting apparatus has been applied to the synchronous motor 2 as the motor. The inverter protecting apparatus in accordance with the present invention, however, can be also effectively applied to a synchronous induction motor or an induction motor in which the rotor thereof is constructed of a rotor yoke and a squirrel-cage secondary conductors that is located around the rotor yoke and formed by die casting.

Thus, according to the present invention described in detail above, the inverter according to the present invention is provided with a plurality of switching devices connected between an anode and a cathode of a DC power source, a plurality of detecting devices that convert the currents passing through the plurality of switching devices into voltages and generate detection outputs, a plurality of comparing devices that receive the detection outputs of the detection devices and generate an abnormality output if the absolute values of the detection outputs exceed a predetermined value, and a protecting device that interrupts the drive of all the switching devices if any of the comparing devices generates the abnormality output. Hence, it is possible to monitor for overcurrent flowing into the switching devices without using costly current transformers used in a prior art, and to interrupt the drive of the switching devices before a current level at which the switching devices are damaged is reached, thereby permitting the protection of the switching devices.

Furthermore, since the currents passing through the pairs of switching devices can be detected without using current transformers, it is no longer necessary to calculate the current of the phase for which no current transformer is inserted, thus permitting reduced production cost as a whole.

In addition, according to the present invention, the inverter has the plurality of pairs of switching devices connected in parallel between the anode and the cathode of the DC power source, each of the pairs being formed of the switching devices connected in series. The inverter uses, as outputs, the connection points of the switching devices of the pairs to convert DC to AC, and the detecting devices convert the currents passing through the switching devices connected to the cathode into voltages and generate detection outputs. This arrangement obviates the need for insulating devices, such as insulated amplifiers, that would be required for detecting the currents passing through the switching devices connected to the anode.

Furthermore, according to the present invention, if an abnormality output from the comparing devices occurs and lasts for a predetermined period of time, the protecting device interrupts the drive of the switching devices. Hence, the protecting device is not actuated by a temporary current, such as a spike current attributable to turning ON/OFF of the switching devices, while the protecting device reacts to a lasting abnormal current, thus making it possible to prevent damage to the inverter caused by the lasting abnormal current. This arrangement permits extremely stable drive of the inverter to be achieved.

According to the present invention, if the drive of the switching devices is interrupted, the protecting device holds an interruption state until a predetermined release instruction is issued. Hence, even if a malfunction occurs due to a noise, damage to the inverter can be prevented.

According to the present invention, the detection outputs of the detecting devices are the information for detecting the condition of a motor driven by the inverter, so that the information can also be used for presuming the rotational position of the rotor of the motor. This arrangement allows the protection of the inverter to be achieved at lower cost.

According to the present invention, the motor is a synchronous motor having permanent magnets in its rotor; hence, it is possible to interrupt the drive of an inverter before a current reaches a level at which the permanent magnets provided in the rotor are demagnetized. With this arrangement, it is possible to prevent an inconvenience in which, for example, an abnormal current flows in for some reason while the synchronous motor is running at a high temperature, causing the rare earth type permanent magnets provided in the rotor to be demagnetized.

According to the present invention, the motor is a synchronous induction motor having permanent magnets in its rotor; hence, it is possible to interrupt the drive of an inverter before a current reaches a level at which the permanent magnets provided in the rotor are demagnetized, as in the above case. With this arrangement, it is possible to prevent an inconvenience in which, for example, an abnormal current flows in for some reason while the synchronous motor is running at a high temperature, causing the rare earth type permanent magnets provided in the rotor to be demagnetized.

According to the present invention, the motor is an induction motor, so that it is possible to prevent a winding from being burnt due to passage of an abnormal current through the induction motor.

What is claimed is:

1. A protected apparatus for generating AC current, comprising:

an inverter formed of a plurality of switching devices connected between the positive and negative terminals of a DC power source to convert DC current to alternating polarity AC current, a plurality of detecting means that convert the alternating polarity currents passing through the plurality of switching devices into voltages and generate alternating polarity detection outputs;

a plurality of comparing means that receive the detection outputs of said detection means and generate an abnormality output if the absolute values of the detection outputs exceed a predetermined value; and a protecting means that interrupts the drive of all said switching devices if any of said comparing means generates the abnormality output.

2. The apparatus according to claim 1, wherein said inverter comprises a plurality of pairs of said switching devices connected in parallel between said positive and negative terminals of the DC power source, each of said pairs being formed of said switching devices connected in series, and having as outputs the connection points of the switching devices of said pairs to convert DC current to AC current and said detecting means converting the currents passing through said pairs of switching devices into a respective voltage for each pair, and generating said detection outputs.

3. The apparatus according to claim 1 or 2, wherein said protecting means interrupts the drive of said switching devices if an abnormal output from the comparing means occurs and lasts for a predetermined period of time.

4. The apparatus according to claim 1, 2, or 3, wherein if the drive of said switching devices is interrupted, said protecting means maintains the interruption state until a predetermined release instruction is issued.

5. The apparatus according to claim 1, 2, 3, or 4, wherein the detection output of said detecting means is the information for detecting the condition of a motor driven by said inverter.

6. The apparatus according to claim 5, wherein said motor is a synchronous motor having a permanent magnet in its rotor.

7. The apparatus according to claim 5, wherein said motor is a synchronous induction motor having a permanent magnet in its rotor.

8. The apparatus according to claim 5, wherein said motor is an induction motor.

9. The apparatus according to claim 1 wherein said inverter produces three phases of alternating current for a three phase motor and each phase of the alternating currents is applied to a respective one of said plurality of detecting means whose output is applied to a respective one of said plurality of comparing means.

* * * * *